Sept. 17, 1963 L. G. SIMJIAN 3,103,960
DISPENSING SYSTEM WITH RECEPTACLE DESIGNATOR
Filed Sept. 22, 1961 3 Sheets-Sheet 1
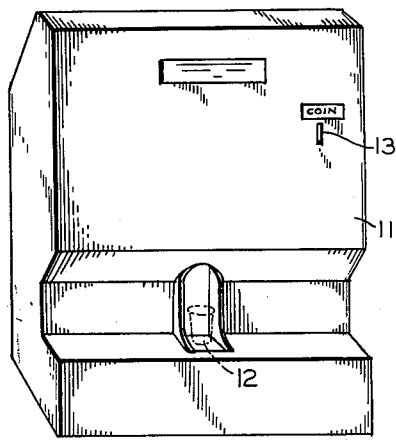
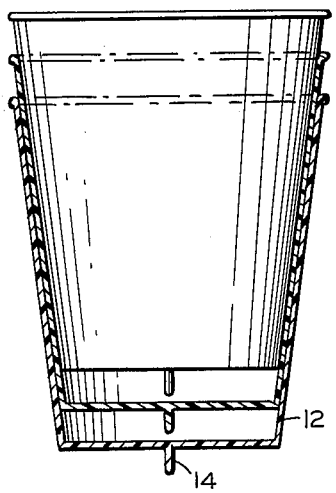
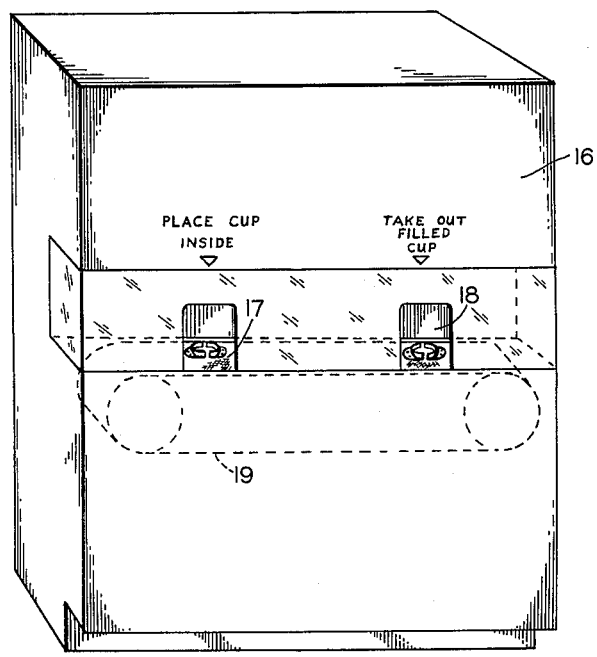
INVENTOR.
LUTHER G. SIMJIAN
BY
AGENT.

Sept. 17, 1963  L. G. SIMJIAN  3,103,960
DISPENSING SYSTEM WITH RECEPTACLE DESIGNATOR
Filed Sept. 22, 1961  3 Sheets-Sheet 2

*INVENTOR.*
LUTHER G. SIMJIAN
BY
Ervin B. Steinberg
AGENT

Sept. 17, 1963  L. G. SIMJIAN  3,103,960
DISPENSING SYSTEM WITH RECEPTACLE DESIGNATOR
Filed Sept. 22, 1961  3 Sheets-Sheet 3

INVENTOR.
LUTHER G. SIMJIAN
BY
Ervin B. Steinberg
AGENT.

United States Patent Office 3,103,960
Patented Sept. 17, 1963

3,103,960
DISPENSING SYSTEM WITH RECEPTACLE DESIGNATOR
Luther G. Simjian, Greenwich, Conn., assignor to Universal Match Corporation, Ferguson, Mo., a corporation of Delaware
Filed Sept. 22, 1961, Ser. No. 140,069
26 Claims. (Cl. 141—160)

This invention generally is related to dispensing systems and in particular concerns the dispensing of products from automatic vending machines.

More specifically, the invention concerns a dispensing system wherein the operation of the product dispensing apparatus, such as a beverage dispensing apparatus, is controlled by a designator which forms a part of the product receiving receptacle, the designator being sensed when the receptacle is placed in product receiving position. The designator on the receptacle is cancelled upon the product dispensing apparatus being rendered operative, thus preventing re-use of the same product receiving receptacle with the product dispensing apparatus.

Most dispensing apparatus, for instance beverage vending machines, which dispense such products as hot coffee or tea, include not only a beverage dispensing system, but are provided also with a receptacle dispensing device, for instance a cup dispenser. Upon the apparatus being rendered operative, for instance by the deposit of a suitable coin, the cup dispensing device is actuated first for placing a cup into product receiving position. Subsequently, the beverage dispensing portion of the vending machine is actuated to dispense the proper amount of beverage into the receptacle.

It will be apparent that in the apparatus of the type described, each vending machine requires the provision of a receptacle dispensing device, a coin acceptance means and in most cases, a change-making device. These peripheral devices are rather complicated and relatively expensive.

Moreover, the dispensing of products during rush hours, such as coffee breaks, is delayed by the requirement that the coin mechanism and the receptacle dispensing device operate first before the beverage or product dispensing portion can be allowed to function. When considering the dispensing of a beverage, the usual time required for filling the cup is in the order of ten seconds and the time required for the coin and cup dispensing mechanisms to operate in many cases equals the beverage filling time. It will be apparent, therefore, that considerable economies and time advantages can be derived by separating the product dispensing apparatus from the receptacle dispensing mechanism, and in accordance with the principles of the instant invention, it is contemplated that the receptacle dispensing apparatus be a separate entity from the product dispensing apparatus. In this way, the receptacle for receiving the product may be purchased in advance and when such receptacle is brought into engagement with the product dispensing apparatus, the receptacle itself causes the latter apparatus to become operative for dispensing the product, such as the beverage.

In order to assure proper compensation for the product dispensed, the receptacle, such as a cup, must be purchased at a receptacle vending apparatus, the price of the receptacle being adjusted to include the product.

Each receptacle is provided with a designator which enables the purchaser to obtain a predetermined quantity of the product. When the receptacle is brought into product receiving position at the product dispensing apparatus, sensing means suitably disposed, determine the presence of the designator on the receptacle and if such designator is present, cause dispensing of the product. Cancelling means coacting with the product dispensing apparatus cause cancellation or mutilation of the designator to prevent dispensing of the product if the identical receptacle is brought a second time into product receiving position at the product dispensing apparatus.

One of the objects of this invention, therefore, is the provision of a new, novel, and improved dispensing system.

Another object of this invention is the provision of a dispensing system wherein the receptacle which is adapted to receive a product controls the dispensing of such product.

Another object of this invention is the provision of a product receiving receptacle which is provided with an element which is adapted to be mutilated when the receptacle receives such product and wherein the element when in non-mutilated condition initiates the dispensing of the product.

A further object of this invention is the provision of a dispensing system wherein the receptacle dispensing apparatus and the product dispensing apparatus are separate entities, the product dispensing apparatus being controlled by an element or designator on the receptacle which is adapted to receive the product from the product dispensing apparatus.

A further object of this invention is the provision of a dispensing system which is adapted to greatly expedite the flow of patrons during rush hours.

A still further object of this invention is the provision of a dispensing system wherein the receptacle which is adapted to receive a product from a dispensing apparatus is peculiar to the system and wherein only a receptacle having a predetermined characteristic is capable of rendering the product dispensing apparatus operative.

Other and still further objects of this invention will be apparent by referring to the following description when taken in conjunction with the accompanying drawings in which:

FIGURE 1 is an elevational, perspective view of the receptacle dispensing apparatus;

FIGURE 2 is an elevational view, partly in section, of stacked receptacles contained in the dispensing apparatus per FIGURE 1;

FIGURE 3 is a perspective elevational view, of the product dispensing apparatus;

Figure 4:
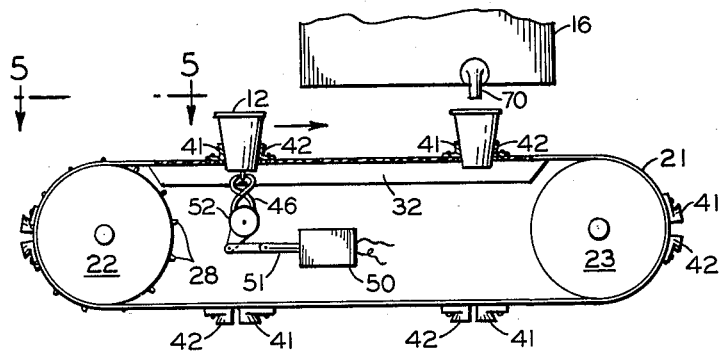
FIGURE 4 is an elevational view of certain portions in FIGURE 3.
Figure 5:
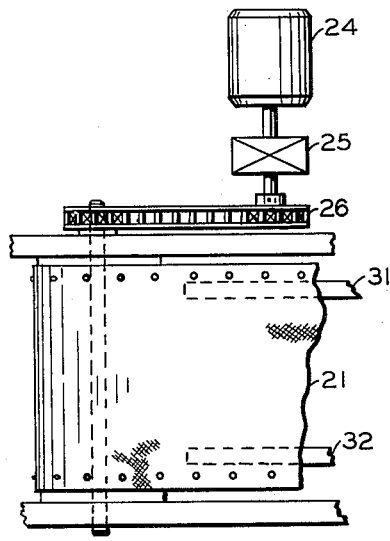
FIGURE 5 is a plan view along lines 5—5 in FIGURE 4.

Referring now to the figures and FIGURE 1 in particular, reference numeral 11 identifies a receptacle dispensing apparatus which is adapted to dispense a receptacle, such as cup 12, in response to the deposit of a suitable coin in coin slot 13. Cup dispensing devices are well known in the art, reference being made for instance to U.S. Patent No. 2,374,168 dated April 24, 1945 entitled "Cup-Dispensing Mechanism."

FIGURE 2 is a close up view of the cups in their nested condition prior to dispensing from the apparatus per FIGURE 1. Each cup is made from paper or plastic material, and for use in conjunction with the product dispensing apparatus described hereafter, each cup is provided with an extending tip 14 which protrudes from the center of the underside. It shall be understood however, that this type of tip is merely illustrative of one embodiment of the present invention and that other means may be used. This tip essentially constitutes a cancellable element or designator which is modified when the receptacle or cup is placed for being filled with the product. In this way, the cup is available for single use only and cannot be reused for receiving a product from the product dispensing apparatus subsequent to the element having been modified or cancelled.

FIGURE 3 is a general view of the product dispensing apparatus, which includes a housing 16, an aperture 17 which is adapted to receive the empty cup, and aperture 18 from which a patron removes the filled cup. The cup may have been filled in apparatus 16 with hot coffee, tea, iced drink, soup or similar product or article. A transport mechanism generally indicated by numeral 19 is used to advance cups placed in aperture 17 to aperture 18.

FIGURES 4, 5, 7, and 8 show further details of the cup receiving and transporting mechanism. Endless belt 21 is mounted about a set of spaced rollers 22 and 23. Roller 22 is driven from a motor 24 via gear reducer mechanism 25 and drive belt 26. In order to avoid slippage, roller 22 is equipped with protruding pins 28 which mesh with corresponding apertures in the belt. A set of rails 31 and 32 steadies the upper straight portion of the belt.

Along spaced intervals, the surface of the belt is provided with sets of cup holders, each set comprising a pair of semi-circular flanges 41 and 42. These flanged holders are shaped in a manner to receive the prescribed receptacle, in this instance, cup 12. The holders are fastened to the belt by rivet 43 or other fastening means as are well known in the art. When cup 12 is placed inside aperture 17, FIGURE 3, and rests in holders 41 and 42, tip 14 extending from the underside of the cup engages the actuating arm of a stationary switch 45 which is disposed at this station. Moreover, there is disposed at this station a cutter 46 which is formed by a pair of plier members 47 and 48 which are mounted for pivotal motion relative to one another about a stationary pin 49. The cutter with its jaws is mounted in such a position that when members 47 and 48 are operated, tip 14 is severed, thereby causing cancellation or multilation of this designator. Members 47 and 48 are operated in response to the pulse energization of solenoid 50 which exerts a pull on arm 51, causing momentary counter clockwise rotation of disk 52 which is coupled to members 47 and 48. Disk 52 is fastened to arm 51 by means of extension 53. Spring 54 returns arm 51 and disk 52 to their non-actuated positions, that is, the jaw of the cutter being open for receiving therein tip 14.

Figure 6:
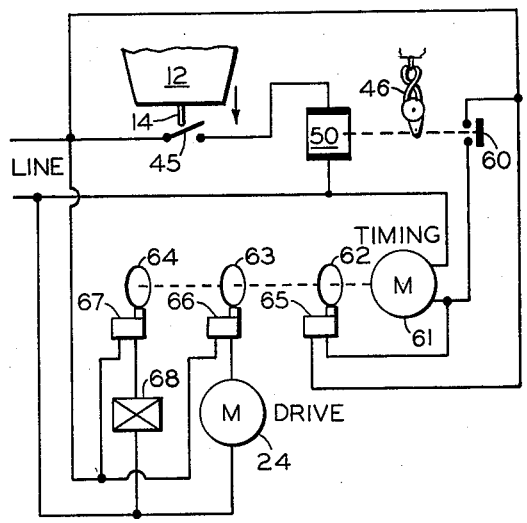
FIGURE 6 is a schematic electrical circuit diagram for the apparatus shown in FIGURE 3.

Operation of the foregoing arrangement will be more clearly understood by referring to the circuit diagram per FIGURE 6. Upon purchasing a cup from receptacle dispensing apparatus 11, the price of the cup being selected of course, to include the commodity which the cup is to receive, cup 12 is placed into product receiving position in aperture 17 of product dispensing apparatus 16. Tip 14 of cup 12 closes switch 45, thereby causing solenoid 50 to become energized. Energizing of solenoid 50 causes corresponding motion of arm 51 which in turn operates cutter 46 by rotation of disk 52 and also closes switch 60. As soon as tip 14 is severed, the arm of switch 45 no longer is depressed, thus releasing solenoid 50 and switch 60.

The momentary closing of switch 60 energizes timing motor 61 which is coupled to three timing cams 62, 63, and 64. Cam 62 energizes a switch 65 which keeps motor 61 running for one complete timing cycle despite switch 60 being opened as soon as tip 14 has been cut by cutter 46. Timing cam 63 via switch 66 controls the advance of cup 12 from aperture 17 to aperture 18 by controlling the duration of operation of drive motor 24 which drives endless belt 21. Cam 64 via switch 67 operates a fluid control valve 68 which controls the dispensing of the product into cup 12 when the cup is disposed underneath spout 70, FIGURE 4.

It will be apparent that the cup can be used only a single time, and that in the event the cup fails to be provided with the tip by virtue of a substitute cup or the tip having been multilated during a previous dispensing operation, the cup will fail to energize the product dispensing apparatus and its control circuit and in this instance, no beverage is dispensed.

Although for the sake of clarity the sensing station and the receptacle filling station are shown as separate stations, i.e. aperture 17 and aperture 18, it shall be clearly understood by those skilled in the art that both stations can readily be combined to comprise a single aperture in the product dispensing apparatus 16. This modification is well comprehended by the intent and spirit of this invention.

Moreover, the element adapted to be sensed and subsequently cancelled, such as tip 14 illustrated heretofore, may take many forms and may be provided on one or more surfaces of the receptacle. Instead of being severed, such element may be cancelled for instance by perforation or any other means which signify cancellation or alteration.

Figure 9:
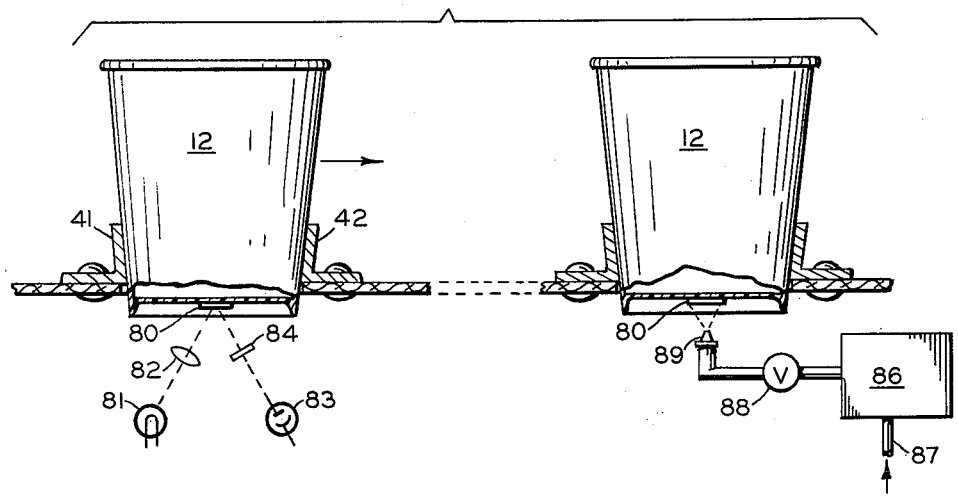
FIGURE 9 is an alternative embodiment of the invention.

An alternative embodiment of the invention is shown in FIGURE 9. The underside of cup 12 is provided with a colored element or designator 80. This designator is illuminated by a light source 81 through lens 82 when the receptacle is inserted into holders 41 and 42. Photoelectric sensing means 83 via a color filter 84 receives a signal when the designator 80 is of proper color response and sets timing motor 61, FIGURE 6, in operation. The photocell therefore replace mechanically actuated switch 45. As cup 12 comes to rest underneath spout 70 and is being filled with the liquid, concurrently therewith, a paint spraying apparatus 86 connected to a supply of compressed air via tube 87 releases via control valve 88 and nozzle 89 a small amount of pigment to alter and cancel the previously valid designator. The operation of valve 88 is controlled by a timing cam driven from motor 61, which modification will readily be understood by those skilled in the art.

Figure 10:
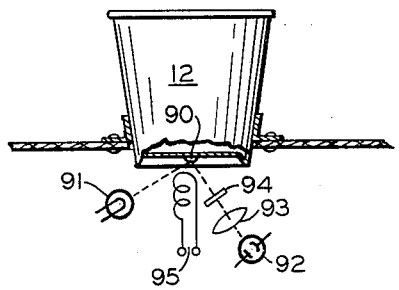
FIGURE 10 is a still further embodiment of the instant invention.
Figure 7:
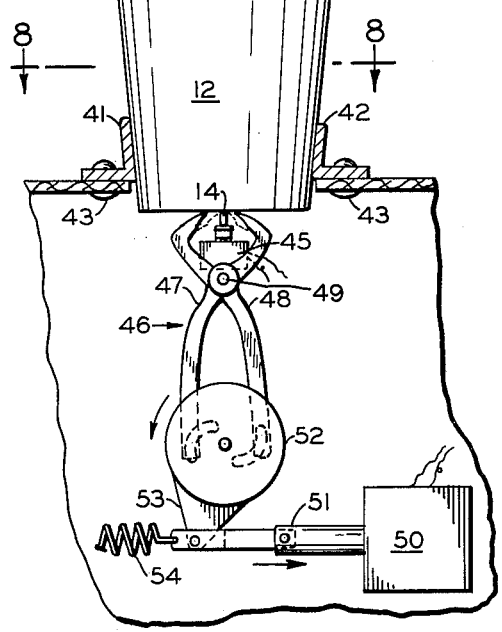
FIGURE 7 is an elevational view, partly in section, depicting in greater detail the cancelling means indicated in FIGURE 4.
Figure 8:
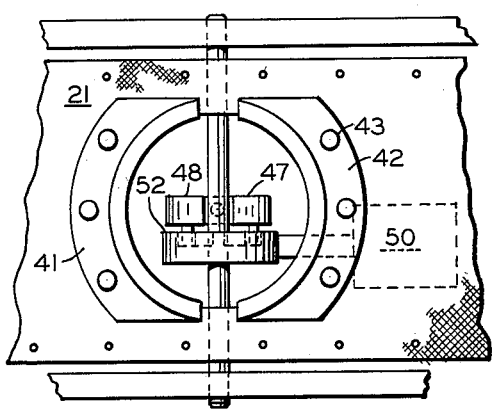
FIGURE 8 is a top plan view along lines 8—8 in FIGURE 7 with the product receiving receptacle removed.

A further alternative embodiment of the invention is shown in FIGURE 10 wherein a heat sensitive designator 90 is provided at the underside of the receptacle 12. This designator is adapted to be illuminated by lamp 91 and its presence is sensed by photoelectric means 92 via lens 93, and color filter 94. If the product with which cup 12 is filled, is hot, the heat sensitive designator can readily be made of such material as to change its color as the result of this inherent property of the product dispensed. If the heat sensitive element is fastened to the underside by wax or other suitable adhesive, the designator can be constructed to drop off. Alternatively, an externally actuated heating element 95 can readily be placed at the sensing station and in proximity to the cup, the heating element being energized in response to the signal on photoelectric means 92 whereby to modify or cancel the designator 90. Typical marking means in the form of pellets, crayon or liquids which change color at a predetermined temperature are available for instance from the Tempil Corporation, New York 11, New York.

A still further embodiment of this invention comprises the use of a magnetic designator provided on each cup, which designator is sensed by magnetically responsive means. Thin film magnetic elements as recently developed for memory storage in electronic computers provide a good illustration of such a designator. Also selectively placed magnetic spots as revealed for instance in U.S. Patent No. 2,931,953 may be used, which spots are modified mechanically or magnetically after the presence thereof has been established.

A further and still other embodiment comprises the use of a designator at the inside of the receptacle which designator is made of a composition to react for instance with the liquid of the beverage by being dissolved, discolored or disfigured as the result of contact with the product. In a typical example, the designator may be a small piece of litmus paper disposed at the inside of the cup. Litmus discolors upon contact with the beverage in view of the chemical content of the respective beverage. Photoelectric sensing means are used to sense the presence of the litmus paper in its non-cancelled condition prior to the product dispensing apparatus being rendered operative.

It will be apparent that the various examples described hereinabove are merely illustrative of the broad principle disclosed and that many other designators may be devised taking advantage for example of various electrical, mechanical, chemical and optical properties of materials.

In the event that the product to be dispensed is coffee, tea or the like, such ingredients as cream, sugar, etc., may be made available at the receptacle dispensing apparatus 11 so that these ingredients are available in advance of dispensing the main product which is controlled by the cancellable designator or element on the article receiving receptacle.

While there have been described and illustrated several embodiments of the invention, it will be understood by those skilled in the art that various further modifications and changes may be made therein without deviating from the principle and intent of the present invention which shall be limited only by the scope of the appended claims.

What is claimed is:

1. In a dispensing system which comprises a product dispensing apparatus and a receptacle adapted to receive said product from said apparatus when the receptacle is in a product receiving position relative to said apparatus, the combination of: an element adapted to be mutilated disposed on said receptacle; sensing means disposed for sensing the presence of said element when the receptacle is in the product receiving position; release means disposed on said apparatus for controlling the release of said product; said sensing means coacting with said release means for causing said apparatus to dispense the product upon the sensing means determining the presence of said element in its non-mutilated condition, and means causing said element to be mutilated when the apparatus is caused to dispense said product into the receptacle.

2. In a dispensing system which comprises a product dispensing apparatus and a receptacle adapted to receive said product from said apparatus when the receptacle is supported in product receiving position relative to said apparatus, the combination of: support means for receiving said receptacle and supporting it in position for receiving said product; an element adapted to be mutilated disposed on said receptacle; sensing means disposed at said support means for sensing the presence of said element; release means disposed on said apparatus for controlling the release of said product; said sensing means coacting with said release means for causing said apparatus to dispense the product upon the sensing means determining the presence of said element in its non-mutilated condition, and means causing said element to be mutilated in response to the apparatus being caused to dispense said product into the receptacle.

3. In a dispensing system which comprises a product dispensing apparatus and a receptacle adapted to receive said product from said apparatus when the receptacle is in a product receiving position relative to said apparatus, the combination of: a designator adapted to be cancelled disposed on said receptacle; sensing means disposed for sensing the presence of said designator when the receptacle is in the product receiving position; release means disposed on said apparatus for controlling the release of said product; said sensing means coacting with said release means for causing said apparatus to dispense the product upon the sensing means determining the presence of said designator in its non-cancelled condition, and means causing said designator to be cancelled when the apparatus is caused to dispense said product into the receptacle.

4. In a dispensing system which comprises a product dispensing apparatus and a receptacle adapted to receive said product from said apparatus when the receptacle is in a product receiving position relative to said apparatus, the combination of: a designator adapted to be cancelled disposed on said receptacle; sensing means disposed for sensing the presence of said designator when the receptacle is disposed for receiving said product; said sensing means providing a signal in response to the presence of said designator in its non-cancelled condition; release means connected to said apparatus for controlling the release of said product; said release means adapted to receive the signal from the sensing means and causing the apparatus to dispense the product in response to the receipt of said signal, and means causing cancellation of said designator in response to the release means causing the apparatus to dispense the product.

5. In a dispensing system which comprises a product dispensing apparatus and a receptacle adapted to receive said product from said apparatus when the receptacle is in a product receiving position relative to said apparatus, the combination of: a designator adapted to be cancelled disposed on said receptacle; sensing means disposed for sensing the presence of said designator when the receptacle is in the product receiving position; release means disposed on said apparatus for controlling the release of said product; said sensing means coacting with said release means for causing said apparatus to dispense the product upon the sensing means determining the presence of said designator in its non-cancelled condition, and said product coacting with said designator for causing cancellation thereof in response to the product being received in said receptacle.

6. In a dispensing system as set forth in claim 5 wherein said product is a liquid.

7. In a dispensing system as set forth in claim 5 wherein said product is a hot liquid.

8. In a dispensing system which comprises a product dispensing apparatus and a receptacle adapted to receive said product from said apparatus when the receptacle is in a product receiving position relative to said apparatus, the combination of: a designator adapted to be cancelled disposed on said receptacle; sensing means disposed for sensing the presence of said designator when the receptacle is disposed for receiving said product; said sensing means providing a signal in response to the presence of said designator in its non-cancelled condition; release means connected to said apparatus for controlling the release of said product; said release means adapted to receive the signal from the sensing means and causing the apparatus to dispense the product in response to the receipt of said signal; means adapted to engage the designator for causing cancellation thereof when the receptacle is placed for receiving said product, and said means being operated in response to the sensing means causing operation of said release means.

9. In a dispensing system which comprises a product dispensing apparatus and a receptacle adapted to receive said product from said apparatus when the receptacle is in a product receiving position relative to said apparatus, the combination of: support means for receiving said receptacle and supporting it in product receiving position; a designator adapted to be cancelled disposed on said receptacle; sensing means disposed at said support means for sensing the presence of said designator when the receptacle is disposed on said support means; said sensing means adapted to provide a signal in response to the presence of said designator in its non-cancelled condition on said receptacle; release means connected to said apparatus for controlling the release of said product; said release means adapted to receive the signal from the sensing means and causing the apparatus to dispense the product in response to the receipt of said signal; means disposed at said support means and being adapted to engage the designator for causing cancellation thereof when the receptacle is on said support means, and said means cancelling said designator being operated in response to the sensing means causing operation of said release means and said receptacle receiving said product, whereby to prevent said apparatus from becoming operable when the identical receptacle is re-used with said apparatus.

10. In a dispensing system as set forth in claim 9 wherein said designator is a part of the receptacle which part is altered in response to the operation of said means cancelling said designator.

11. In a dispensing system as set forth in claim 9 wherein said sensing means are actuated by the designator forming a part of the receptacle structure.

12. In a dispensing system as set forth in claim 9 wherein said sensing means use radiant energy for sensing the presence of said designator on said receptacle.

13. In a dispensing system as set forth in claim 9 wherein said designator is a color mark on the receptacle.

14. In a dispensing system as set forth in claim 9 wherein said designator is cancelled in response to a characteristic inherent in the product received by the receptacle.

15. In a dispensing system which comprises a receptacle dispensing apparatus and a product dispensing apparatus, said receptacle dispensing apparatus adapted to hold and dispense receptacles which are adapted to receive a product from the product dispensing apparatus when a respective receptacle is in a product receiving position relative to said product dispensing apparatus, the combination of: each of the receptacles disposed in the receptacle dispensing apparatus provided with a designator which is adapted to be cancelled; sensing means disposed for sensing the presence of the designator when the receptacle is placed in product receiving position relative to said product dispensing apparatus; release means disposed on said product dispensing apparatus for controlling the release of said product; said sensing means coacting with said release means for causing said apparatus to dispense the product in response to the sensing means determining the presence of said designator in its non-cancelled condition when the receptacle is in product receiving position, and means disposed for causing said designator to be cancelled when the product dispensing apparatus is caused to dispense said product into the receptacle.

16. In a dispensing system which comprises a receptacle dispensing apparatus and a product dispensing apparatus, said receptacle dispensing apparatus adapted to hold and dispense receptacles which are adapted to receive a product from the product dispensing apparatus when a respective receptacle is in a product receiving position relative to said product dispensing apparatus, the combination of: currency acceptance means and receptacle release means disposed on said receptacle dispensing apparatus; said release means dispensing a receptacle in response to the acceptance means receiving a deposit of currency; each of the receptacles dispensed by said apparatus being provided with a designator which is adapted to be cancelled; sensing means disposed for sensing the presence of the designator when the dispensed receptacle is placed in product receiving position relative to said product dispensing apparatus; release means disposed on said product dispensing apparatus for controlling the release of said product; said sensing means coacting with said release means for causing said apparatus to dispense the product in response to the sensing means determining the presence of said designator in its non-cancelled condition when the receptacle is in product receiving position, and means disposed for causing said designator to be cancelled when the product dispensing apparatus is caused to dispense said product into the receptacle.

17. In a dispensing system which comprises a receptacle dispensing apparatus and a product dispensing apparatus, said receptacle dispensing apparatus adapted to hold and dispense receptacles which are adapted to receive a product from the product dispensing apparatus when a respective receptacle is in a product receiving position relative to said product dispensing apparatus, the combination of: currency acceptance means and receptacle release means disposed on said receptacle dispensing apparatus; said release means dispensing a receptacle in response to the acceptance means receiving a deposit of currency; each of the receptacles dispensed by said apparatus being provided with a designator which is adapted to be cancelled; sensing means disposed for sensing the presence of the designator when the dispensed receptacle is placed in product receiving position relative to said product dispensing apparatus; release means disposed on said product dispensing apparatus for controlling the release of said product; said sensing means coacting with said release means for causing said apparatus to dispense the product in response to the sensing means determining the presence of said designator in its non-cancelled condition when the receptacle is in product receiving position, and said designator being cancelled in response to the product dispensing apparatus dispensing said product into the receptacle whereby to prevent operation of the product dispensing apparatus when the identical receptacle is placed again in said product receiving position.

18. In a dispensing system which comprises a product dispensing apparatus and a receptacle adapted to receive a product from said apparatus when said receptacle is in a product receiving position relative to said apparatus, the combination of: a designator adapted to be mutilated disposed on said receptacle; sensing means disposed for sensing the presence of said designator when said receptacle is in said product receiving position; release means disposed on said apparatus for controlling the release of the product from said apparatus, and said sensing means coacting with said release means for causing said apparatus to dispense the product into said receptacle upon said sensing means determining the presence of said designator in its non-mutilated condition.

19. In a dispensing system which comprises a product dispensing apparatus and a receptacle adapted to receive a product from said apparatus when said receptacle is in a product receiving position relative to said apparatus, the combination of: a designator adapted to be mutilated disposed on said receptacle; sensing means disposed for sensing the presence of said designator when said receptacle is in said product receiving position; release means disposed on said apparatus for controlling the release of the product from said apparatus, and control means connected to said sensing means and said release means for causing said apparatus to dispense the product in response to said sensing means determining the presence of said designator in its non-mutilated condition on said receptacle.

20. A system according to claim 18 wherein said designator is affixed to said receptacle.

21. A system according to claim 18 wherein said designator is integral with the structure of said receptacle.

22. A system according to claim 18 wherein said designator has the physical characteristic of frangibility.

23. A system according to claim 18 wherein said sensing means senses a predetermined physical characteristic of said designator, which designator characteristic is adapted to be changed by a physical characteristic in the product received by said receptacle.

24. A system according to claim 18 wherein said sensing means physically engages said designator in its non-mutilated condition.

25. A system according to claim 18 wherein said sensing means uses radiant energy for sensing the presence of said designator in its non-mutilated condition.

26. A system according to claim 18 wherein said designator is a color mark on said receptacle.

References Cited in the file of this patent
UNITED STATES PATENTS

| | | |
|---|---|---|
| 1,393,276 | Fuller | Oct. 11, 1921 |
| 1,789,018 | Optiz | Jan. 13, 1931 |
| 2,727,670 | Shore | Dec. 20, 1955 |